(12) United States Patent
Braunberger et al.

(10) Patent No.: US 7,632,101 B2
(45) Date of Patent: Dec. 15, 2009

(54) METHOD AND APPARATUS FOR PERIODICALLY QUESTIONING A USER USING A COMPUTER SYSTEM OR OTHER DEVICE TO FACILITATE MEMORIZATION AND LEARNING OF INFORMATION

(75) Inventors: Alfred S. Braunberger, Sequim, WA (US); Beau M. Braunberger, Los Angeles, CA (US)

(73) Assignee: Vision Works IP Corporation, Sequim, WA (US)

( * ) Notice: Subject to any disclaimer, the term of this patent is extended or adjusted under 35 U.S.C. 154(b) by 17 days.

(21) Appl. No.: 10/264,581

(22) Filed: Oct. 4, 2002

(65) Prior Publication Data

US 2003/0077559 A1 Apr. 24, 2003

Related U.S. Application Data

(60) Provisional application No. 60/327,610, filed on Oct. 5, 2001.

(51) Int. Cl.
*G09B 3/00* (2006.01)

(52) U.S. Cl. .................... 434/322; 434/332; 434/350

(58) Field of Classification Search ............ 434/118, 434/326, 255, 322, 332, 350; 715/927
See application file for complete search history.

(56) References Cited

U.S. PATENT DOCUMENTS

| | | | |
|---|---|---|---|
| 1,272,553 A | 7/1918 | Spotswood | |
| 1,509,371 A | 9/1924 | Nalle | |
| 1,527,126 A | 2/1925 | Dodd | |
| 1,678,621 A | 7/1928 | Holmes | |
| 2,327,194 A | 8/1943 | Kopas | 35/22 |
| 2,359,460 A | 10/1944 | Barens | 35/22 |
| 3,172,214 A | 3/1965 | Aberge et al. | 35/8 |
| 3,714,721 A | 2/1973 | Tilley | 35/9 R |
| 3,755,921 A | 9/1973 | Heller | 35/22 R |
| 3,763,576 A | 10/1973 | Sulkin | 35/48 R |
| 3,873,095 A | 3/1975 | Nehre | 273/130 R |
| 3,928,922 A | 12/1975 | Rosenbaum | 35/9 R |
| 3,970,312 A | 7/1976 | Senn | 273/130 A |
| 4,008,529 A | 2/1977 | Yorkston | 35/35 E |
| 4,090,717 A | 5/1978 | Rossetti | 273/249 |
| 4,107,852 A | 8/1978 | Epstein | 35/8 R |
| 4,156,315 A | 5/1979 | Fiore et al. | 35/8 R |
| 4,234,933 A | 11/1980 | Adelson et al. | 364/900 |
| 4,257,306 A | 3/1981 | Laflamme | 84/485 R |
| 4,345,315 A | 8/1982 | Cadotte et al. | 364/900 |

(Continued)

*Primary Examiner*—Cameron Saadat
(74) *Attorney, Agent, or Firm*—Haverstock & Owens LLP

(57) ABSTRACT

A system and method for ensuring that a user on a host system periodically performs educational tasks is disclosed. The system comprises a host system on which an educational application and a primary application can execute; means for suspending the primary application when a suspension criterion is met; means for executing an interactive educational application on the host system until a resumption criterion is met; and means for resuming the primary application on the host system when the resumption criterion is met. The method comprises (a) suspending a primary application based on a suspension criterion; (b) presenting on a presentation device an educational task from a set of educational tasks; (c) receiving a user-generated response on an input device; (d) repeating steps (b) and (c) until a resumption criterion is met; and (e) resuming the primary application when the resumption criterion is met.

98 Claims, 8 Drawing Sheets

U.S. PATENT DOCUMENTS

| | | | |
|---|---|---|---|
| 4,358,277 A | 11/1982 | Moyes et al. | 434/322 |
| 4,425,096 A | 1/1984 | Schwake | 434/201 |
| 4,509,922 A | 4/1985 | Battle | 434/322 |
| 4,568,086 A | 2/1986 | Krogh | 273/141 R |
| 4,627,818 A | 12/1986 | Von Fellenberg | 434/236 |
| 4,650,426 A | 3/1987 | Brigance | 434/322 |
| 4,671,772 A | 6/1987 | Slade et al. | 434/219 |
| 4,682,958 A | 7/1987 | Slavik et al. | 434/335 |
| 4,753,597 A | 6/1988 | Pash et al. | 434/321 |
| 4,807,878 A | 2/1989 | Tripp | 278/1 E |
| 4,946,391 A | 8/1990 | Hawkins et al. | 434/201 |
| 4,950,167 A | 8/1990 | Harris | 434/322 |
| 5,002,491 A | 3/1991 | Abrahamson et al. | 434/322 |
| 5,033,969 A | 7/1991 | Kamimura | 434/322 |
| 5,035,625 A * | 7/1991 | Munson et al. | 434/332 |
| 5,055,053 A | 10/1991 | Hyman | 434/343 |
| 5,057,020 A | 10/1991 | Cytanovich | 434/178 |
| 5,059,127 A | 10/1991 | Lewis et al. | 434/353 |
| 5,072,385 A | 12/1991 | Rebeillard et al. | 364/419 |
| 5,141,439 A | 8/1992 | Cousins | 434/178 |
| 5,142,358 A * | 8/1992 | Jason | 348/61 |
| 5,145,447 A | 9/1992 | Goldfarb | 446/408 |
| 5,161,977 A | 11/1992 | Thomas, Jr. | 434/322 |
| 5,183,399 A | 2/1993 | Muller | 434/322 |
| 5,211,563 A | 5/1993 | Haga et al. | 434/322 |
| 5,211,564 A | 5/1993 | Martinez et al. | 434/323 |
| 5,240,419 A | 8/1993 | deGyarfas | 434/322 |
| 5,261,823 A | 11/1993 | Kurokawa | 434/323 |
| 5,267,865 A * | 12/1993 | Lee et al. | 434/350 |
| 5,273,437 A | 12/1993 | Caldwell et al. | 434/351 |
| 5,286,036 A * | 2/1994 | Barabash | 273/429 |
| 5,294,229 A | 3/1994 | Hartzell et al. | 434/336 |
| 5,295,836 A | 3/1994 | Ryu et al. | 434/335 |
| 5,314,340 A | 5/1994 | Gaddis | 434/327 |
| 5,316,485 A | 5/1994 | Hirose | 434/322 |
| 5,379,213 A | 1/1995 | Derks | 364/411 |
| 5,407,357 A | 4/1995 | Cutler | 434/335 |
| 5,411,271 A | 5/1995 | Mirando | 273/434 |
| H1452 H | 6/1995 | Kennedy | 434/322 |
| 5,433,615 A | 7/1995 | Clark | 434/322 |
| 5,437,552 A | 8/1995 | Baer et al. | 434/317 |
| 5,437,553 A | 8/1995 | Collins et al. | 434/322 |
| 5,437,554 A | 8/1995 | Clark et al. | 434/322 |
| 5,449,293 A | 9/1995 | Chang et al. | 434/322 |
| 5,458,493 A | 10/1995 | Clark et al. | 434/322 |
| 5,465,982 A | 11/1995 | Rebane | 273/433 |
| 5,466,159 A | 11/1995 | Clark et al. | 434/322 |
| 5,489,213 A | 2/1996 | Makipaa | 434/322 |
| 5,496,177 A | 3/1996 | Collia et al. | 434/118 |
| 5,503,561 A | 4/1996 | Cohen | 434/236 |
| 5,513,993 A | 5/1996 | Lindley et al. | 434/319 |
| 5,531,600 A | 7/1996 | Baer et al. | 434/317 |
| 5,545,044 A | 8/1996 | Collins et al. | 434/322 |
| 5,556,283 A | 9/1996 | Stendardo et al. | 434/188 |
| 5,558,521 A | 9/1996 | Clark et al. | 434/322 |
| 5,565,316 A | 10/1996 | Kershaw et al. | 434/322 |
| 5,577,919 A | 11/1996 | Collins et al. | 434/322 |
| 5,584,699 A | 12/1996 | Silver | 434/201 |
| 5,586,889 A | 12/1996 | Goodman | 434/327 |
| 5,615,134 A | 3/1997 | Newsham et al. | 364/550 |
| 5,616,033 A | 4/1997 | Kerwin | 434/118 |
| 5,618,182 A | 4/1997 | Thomas | 434/323 |
| 5,632,488 A | 5/1997 | Sturm et al. | 273/293 |
| 5,632,624 A | 5/1997 | Cameron et al. | 434/322 |
| 5,645,432 A | 7/1997 | Jessop | 434/322 |
| 5,667,387 A | 9/1997 | Klemm | 434/224 |
| 5,672,060 A | 9/1997 | Poor | 434/322 |
| 5,681,170 A | 10/1997 | Rieber et al. | 434/355 |
| 5,690,497 A | 11/1997 | Clark et al. | 434/322 |
| 5,700,149 A | 12/1997 | Johnson, III et al. | 434/322 |
| 5,709,551 A | 1/1998 | Clark et al. | 434/322 |
| 5,716,213 A | 2/1998 | Clark et al. | 434/322 |
| 5,716,273 A * | 2/1998 | Yuen | 463/29 |
| 5,718,591 A | 2/1998 | Clark et al. | 434/322 |
| 5,721,845 A | 2/1998 | James et al. | 395/326 |
| 5,724,262 A | 3/1998 | Ghahramani | 364/551.01 |
| 5,725,384 A | 3/1998 | Ito et al. | 434/350 |
| 5,730,604 A | 3/1998 | Jay et al. | 434/365 |
| 5,733,128 A | 3/1998 | Getz | 434/157 |
| 5,735,693 A | 4/1998 | Groiss | 434/167 |
| 5,735,694 A | 4/1998 | Clark et al. | 434/322 |
| 5,738,527 A | 4/1998 | Lundberg | 434/322 |
| 5,743,742 A | 4/1998 | Morrel-Samuels | 434/236 |
| 5,743,743 A * | 4/1998 | Ho et al. | 434/236 |
| 5,746,602 A | 5/1998 | Kikinis | 434/169 |
| 5,749,736 A | 5/1998 | Griswold et al. | 434/362 |
| 5,752,836 A | 5/1998 | Clark et al. | 434/322 |
| 5,769,643 A | 6/1998 | Stevens, III | 434/350 |
| 5,795,155 A | 8/1998 | Morrel-Samuels | 434/107 |
| 5,797,753 A | 8/1998 | Griswold et al. | 434/322 |
| 5,797,754 A | 8/1998 | Griswold et al. | 434/322 |
| 5,800,178 A | 9/1998 | Gillio | 434/262 |
| 5,800,181 A | 9/1998 | Heinlein et al. | 434/322 |
| 5,808,908 A | 9/1998 | Ghahramani | 364/551.01 |
| 5,810,599 A * | 9/1998 | Bishop | 434/157 |
| 5,810,605 A * | 9/1998 | Siefert | 434/362 |
| 5,820,386 A | 10/1998 | Sheppard, II | 434/322 |
| 5,822,744 A | 10/1998 | Kesel | 706/52 |
| 5,823,782 A | 10/1998 | Marcus et al. | 434/156 |
| 5,823,789 A | 10/1998 | Jay et al. | 434/365 |
| 5,827,070 A | 10/1998 | Kershaw et al. | 434/322 |
| 5,827,071 A * | 10/1998 | Sorensen et al. | 434/323 |
| 5,839,902 A | 11/1998 | Wood | 434/130 |
| 5,855,483 A | 1/1999 | Collins et al. | 434/322 |
| 5,865,625 A | 2/1999 | Baskerville | 434/157 |
| 5,879,165 A | 3/1999 | Brunkow et al. | 434/322 |
| 5,885,087 A | 3/1999 | Thomas | 434/373 |
| 5,890,911 A | 4/1999 | Griswold et al. | 434/322 |
| 5,902,116 A | 5/1999 | Rieber et al. | 434/355 |
| 5,904,485 A | 5/1999 | Siefert | 434/322 |
| 5,907,831 A * | 5/1999 | Lotvin et al. | 705/14 |
| 5,910,009 A | 6/1999 | Leff et al. | 434/322 |
| 5,933,136 A * | 8/1999 | Brown | 345/741 |
| 5,944,530 A | 8/1999 | Ho et al. | 434/236 |
| 5,944,533 A | 8/1999 | Wood | 434/322 |
| 5,954,516 A | 9/1999 | Heinberg | 434/328 |
| 5,961,333 A | 10/1999 | Harrison et al. | 434/332 |
| 5,967,793 A | 10/1999 | Ho et al. | 434/362 |
| 5,978,648 A | 11/1999 | George et al. | 434/362 |
| 5,980,263 A | 11/1999 | Conover | 434/322 |
| 5,980,264 A | 11/1999 | Lundberg | 434/322 |
| 5,987,302 A | 11/1999 | Driscoll et al. | 434/353 |
| 5,991,595 A | 11/1999 | Romano et al. | 434/353 |
| 6,000,945 A | 12/1999 | Sanchez-Lazer et al. | 434/322 |
| 6,002,915 A | 12/1999 | Shimizu | 434/350 |
| 6,015,297 A | 1/2000 | Liberman | 434/322 |
| 6,018,617 A | 1/2000 | Sweitzer et al. | 395/114 |
| 6,018,732 A | 1/2000 | Bertrand et al. | 706/60 |
| 6,022,221 A | 2/2000 | Boon | 434/156 |
| 6,024,572 A * | 2/2000 | Weyer | 434/169 |
| 6,024,577 A | 2/2000 | Wadahama et al. | 434/322 |
| 6,039,575 A | 3/2000 | L'Allier et al. | 434/323 |
| 6,042,384 A | 3/2000 | Loiacono | 434/322 |
| 6,053,741 A | 4/2000 | Wood | 434/348 |
| 6,064,978 A | 5/2000 | Gardner et al. | 705/10 |
| 6,064,998 A | 5/2000 | Zabloudil et al. | 706/45 |
| 6,065,972 A | 5/2000 | Doan | 434/327 |
| 6,074,216 A | 6/2000 | Cueto | 434/322 |
| 6,077,085 A | 6/2000 | Parry et al. | 434/322 |
| 6,086,381 A | 7/2000 | Downs et al. | 434/322 |
| 6,086,382 A | 7/2000 | Thomas | 434/323 |
| 6,093,026 A | 7/2000 | Walker et al. | 434/322 |
| 6,097,927 A | 8/2000 | LaDue | 434/308 |
| 6,099,320 A | 8/2000 | Papadopoulos | 434/322 |

| | | | |
|---|---|---|---|
| 6,112,049 A * | 8/2000 | Sonnenfeld | 434/350 |
| 6,112,051 A | 8/2000 | De Almeida | 434/362 |
| 6,120,298 A | 9/2000 | Jenkins et al. | 434/236 |
| 6,120,299 A | 9/2000 | Trenholm et al. | 434/323 |
| 6,120,300 A | 9/2000 | Ho et al. | 434/332 |
| 6,125,358 A | 9/2000 | Hubbell et al. | 706/11 |
| 6,139,330 A | 10/2000 | Ho et al. | 434/322 |
| 6,141,528 A | 10/2000 | Remschel | 434/350 |
| 6,141,529 A | 10/2000 | Remschel | 434/350 |
| 6,144,838 A | 11/2000 | Sheehan | 434/362 |
| 6,146,148 A | 11/2000 | Stuppy | 434/322 |
| 6,148,174 A | 11/2000 | Remschel | 434/350 |
| 6,149,438 A | 11/2000 | Richard et al. | 434/322 |
| 6,149,440 A | 11/2000 | Clark et al. | 434/322 |
| 6,154,631 A | 11/2000 | Remschel | 434/350 |
| 6,155,834 A | 12/2000 | New, III | 434/118 |
| 6,155,838 A | 12/2000 | Hyman et al. | 434/322 |
| 6,155,839 A | 12/2000 | Clark et al. | 434/322 |
| 6,159,018 A | 12/2000 | Clark et al. | 434/322 |
| 6,164,974 A | 12/2000 | Carlile et al. | 434/322 |
| 6,164,975 A | 12/2000 | Weingarden et al. | 434/322 |
| 6,168,440 B1 | 1/2001 | Clark et al. | 434/322 |
| 6,171,112 B1 | 1/2001 | Clark et al. | 434/322 |
| 6,173,154 B1 | 1/2001 | Kucinski et al. | 434/359 |
| 6,174,237 B1 | 1/2001 | Stephenson | 463/42 |
| 6,178,308 B1 | 1/2001 | Bobrow et al. | 434/350 |
| 6,178,395 B1 | 1/2001 | Gee | 703/22 |
| 6,181,909 B1 | 1/2001 | Burstein et al. | 434/353 |
| 6,183,260 B1 | 2/2001 | Clark et al. | 434/322 |
| 6,183,261 B1 | 2/2001 | Clark et al. | 434/322 |
| 6,190,178 B1 | 2/2001 | Oh | 434/323 |
| 6,193,518 B1 | 2/2001 | Nocera | 434/236 |
| 6,193,521 B1 | 2/2001 | Clark et al. | 434/322 |
| 6,198,905 B1 | 3/2001 | Remschel | 434/350 |
| 6,201,948 B1 | 3/2001 | Cook et al. | 434/350 |
| 6,208,832 B1 | 3/2001 | Remschel | 434/350 |
| 6,234,806 B1 | 5/2001 | Trenholm et al. | 434/322 |
| 6,254,395 B1 | 7/2001 | Breland et al. | 434/156 |
| 6,257,896 B1 | 7/2001 | Fargano | 434/322 |
| 6,259,889 B1 | 7/2001 | LaDue | 434/308 |
| 6,259,890 B1 | 7/2001 | Driscoll et al. | 434/350 |
| 6,260,033 B1 | 7/2001 | Tatsuoka | 706/45 |
| 6,270,352 B1 | 8/2001 | Ditto | 434/118 |
| 6,280,198 B1 | 8/2001 | Calhoun et al. | 434/236 |
| 6,282,404 B1 | 8/2001 | Linton | 434/350 |
| 6,285,993 B1 | 9/2001 | Ferrell | 706/45 |
| 6,287,123 B1 | 9/2001 | O'Brien | 434/118 |
| 6,293,801 B1 * | 9/2001 | Jenkins et al. | 434/236 |
| 6,295,439 B1 | 9/2001 | Bejar et al. | 434/350 |
| 6,296,487 B1 | 10/2001 | Lotecka | 434/118 |
| 6,299,452 B1 | 10/2001 | Wasowicz et al. | 434/178 |
| 6,301,571 B1 | 10/2001 | Tatsuoka | 706/45 |
| 6,551,104 B2 * | 4/2003 | Becker | 434/201 |
| 6,678,824 B1 * | 1/2004 | Cannon et al. | 713/200 |
| 6,769,918 B1 * | 8/2004 | God | 434/365 |

* cited by examiner

| Topic | Question_No | Question | Answer | Difficulty | Hint | Asked |
|---|---|---|---|---|---|---|
| Science | 1 | Hydrogen and what other molecule combine to form water? | Oxygen | 7-2 | Its Starts with the letter "O" | 0 |
| 710a | 710b | 700 / 710c | 710d | 710e | 710f | 710g |

*Fig. 7*

Options

Configure — 160

When would you like to ask a question?

⦿ 161  [1] ~162  time per  [Week ▽] 163     ○ random 165

[Ok] ~166
[Cancel] ~167

Difficulty

[7-1] ~168

Maximum Number of Tries [3] ~164

Categories — 170

Foreign Language
Math and Science
Spelling
History
Law
Animal World
World Geography

[Add New] ~171
[Remove] ~172
[Move Up] ~173
[Move Down] ~174

~110
~150

Answer Type

Which answer method do you prefer? (When Supported)

180 ⦿ Typed     181 ○ Spoken     182 ○ Graphical

*Fig. 8*

METHOD AND APPARATUS FOR PERIODICALLY QUESTIONING A USER USING A COMPUTER SYSTEM OR OTHER DEVICE TO FACILITATE MEMORIZATION AND LEARNING OF INFORMATION

RELATED APPLICATIONS

This application claims priority under 35 U.S.C. § 119(e) of the U.S. provisional application Ser. No. 60/327,610 filed on Oct. 5, 2001, and titled "A METHOD AND APPARATUS FOR PERIODICALLY QUESTIONING A USER AND USING A COMPUTER SYSTEM OR OTHER DEVICE TO FACILITATE MEMORIZATION AND LEARNING OF INFORMATION." The provisional application Ser. No. 60/327,610 filed on Oct. 5, 2001, and titled "A METHOD AND APPARATUS FOR PERIODICALLY QUESTIONING A USER AND USING A COMPUTER SYSTEM OR OTHER DEVICE TO FACILITATE MEMORIZATION AND LEARNING OF INFORMATION" is hereby incorporated by reference.

FIELD OF THE INVENTION

The present invention relates to educational methods and systems. More particularly, the present invention relates to educational methods and systems that suspend computer applications, television programs, and other applications until a user successfully performs an educational task.

BACKGROUND OF THE INVENTION

Educators and parents are finding it more difficult to ensure that students are taking the time to study. Students have access to many types of electronic equipment that allow them unsupervised diversions. For example, students can logon to Internet chat sessions; play electronic video games on desktop computers, hand-held devices, or television sets; download and play music and videos from the Internet; watch a television program or a DVD video; or surf the World Wide Web. When a student is using a computer, watching a television set, or playing a video game, a parent can never be sure that the child is doing something educational.

Prior art systems have sought to provide educational programs on desktop computers. For example, U.S. Pat. No. 5,980,264, titled "Screen Saver," teaches a screen saver that displays questions and receives answers, testing a user's knowledge on certain topics. The screen saver is only activated on a computer that has not received input from the user for a predetermined time period. The screen saver does not require-that the user answer a question correctly before he is returned to the application that was running on the computer before the screen saver was invoked.

U.S. Pat. No. 5,743,743, titled "Learning Method and System that Restricts Entertainment," to Ho et al. (Ho I), teaches a system and method that decouples peripherals from a system until an educational task has been performed. In one embodiment, Ho I teaches installing a virtual device driver that sits between a program and an actual device driver that handles I/O to a device. The virtual device driver intercepts function calls to the device driver and determines whether the running program can couple to the device. Thus, only approved programs can access the device. This system requires a virtual device driver for each device the system is coupled to. Thus, entry points to each device driver must be rewritten to determine which programs may or may not access the device.

U.S. Pat. No. 6,139,330, titled "Computer-Aided Learning System and Method," to Ho et al. (Ho II), teaches a system and method that test a user on different subjects. The system decouples a device used for entertainment-such as a speaker, a joystick, or a circuit-board that may send and receive signals. In this system, one or more devices are completely unavailable to the user while using a testing system. In one embodiment, this system disables a device driver, reenabling it only when the user performs some specified task, such as attempting to answer a question.

Both Ho I and Ho II envision testing a user when the computer is first turned on. Neither Ho I nor Ho II teaches testing a user at given time intervals or periodically, upon the occurrence of a pre-determined event. Neither Ho I nor Ho II teaches a method or system that allows the user to resume the application running before the testing system was invoked.

None of the prior art references discussed above teach a system that suspends an application program, runs an educational task—including any number of tasks or drills, such as those testing reading comprehension, general knowledge on a subject, or the pronunciation of words in a foreign language—and then efficiently resumes the application program. Accordingly, what is needed is a testing system that can periodically suspend an application program when a configurable suspension criterion is met and resume the application program when a configurable resumption criterion is met.

SUMMARY OF THE INVENTION

Embodiments of the present invention include a method and system for ensuring that a student on a host system periodically performs an educational task, such as correctly answering an educational question. One embodiment of the method comprises (a) suspending a user application based on a suspension criterion; (b) presenting on a presentation device an educational task from a set of educational tasks, such as requiring a user to correctly answer a question on a chosen subject; (c) receiving a user-generated response to the educational task on an input device; (d) repeating steps (b) and (c) until a resumption criterion is met; and (e) resuming the user application.

One embodiment of the system comprises a host system on which a user application can execute; means for suspending the user application on the host system; means for executing an interactive educational application on the host system until a resumption criterion is met; and means for resuming the user application on the host system.

In one embodiment, the system is configured so that an educational task cannot be preempted or removed. Thus, the student is required to perform the educational task before resuming the application that was running on the host system before the educational task is presented.

For both the method and system, the host system can be a personal computer; a video game player; a television set, which can be connected to a video player or a set-top box; and many other electronic devices, including those controlled by any kind of computer or processor. The user application can be a computer application; an Internet session, such as a chat session; a video game executing on a personal computer or a video game player; a television program; or a video. The suspension criterion may be that a pre-determined time interval has elapsed; that a random time interval has elapsed; or, if the host system is a television set, that the start of a television commercial has been detected. The resumption criterion may be that the user-generated response matches a correct response or that a minimum achievement level has been met. Alternatively, the resumption criterion may be that a correct passcode has been entered into the host system, allowing the user application to be resumed.

BRIEF DESCRIPTION OF THE DRAWINGS

FIG. 7 illustrates a record in a Question and Answer database according to one embodiment of the present invention.

FIG. 8 illustrates a computer terminal displaying a graphical user interface used to configure a testing system according to one embodiment of the present invention.

DETAILED DESCRIPTION OF THE INVENTION

Figure 1:
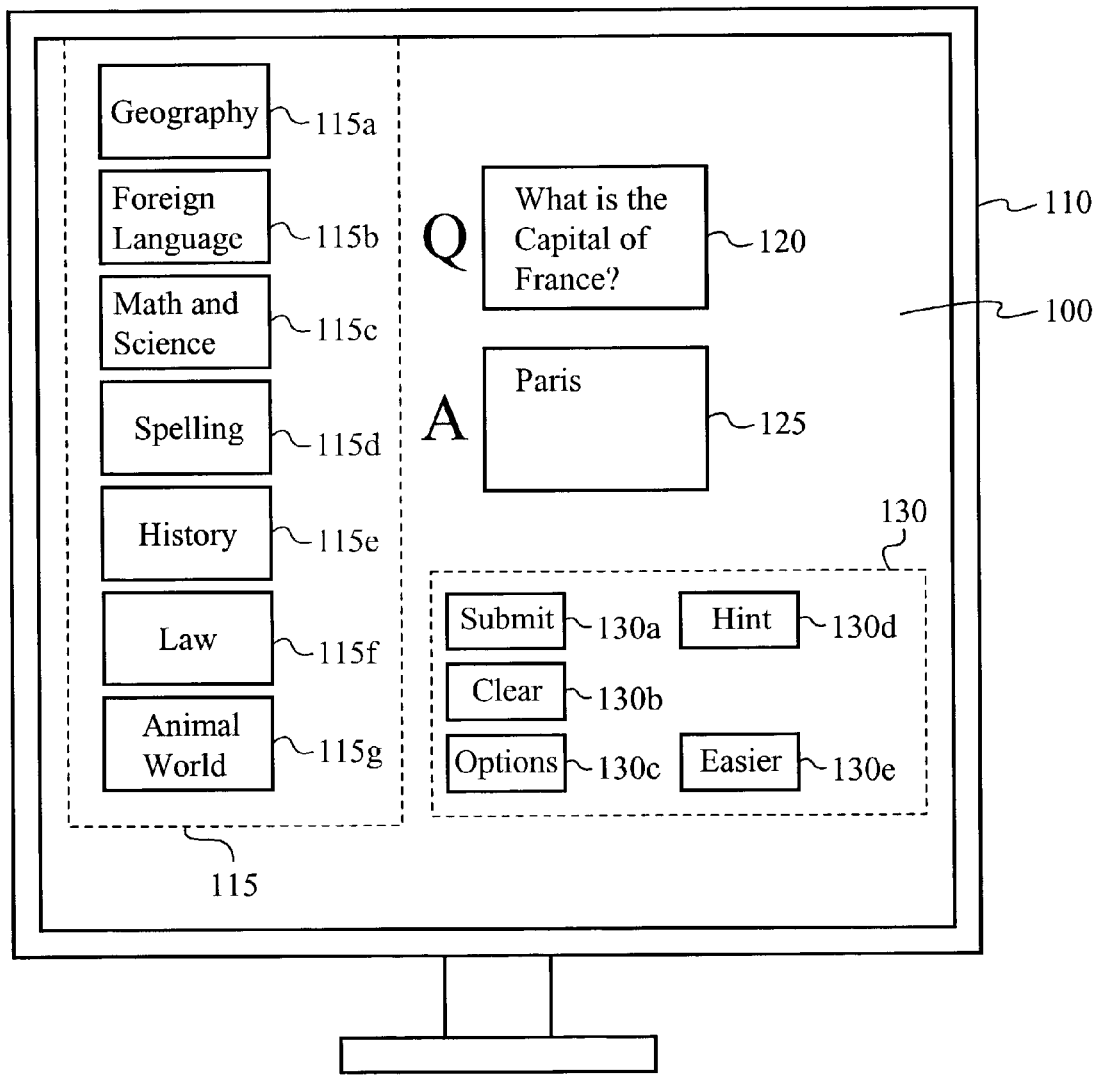
FIG. 1 illustrates a computer terminal displaying a graphical user interface to a testing system according to one embodiment of the present invention.

Embodiments of the present invention are directed to a method and a system that suspend a user application on host systems and require a user, generally a student, to perform educational tasks before the user application program is resumed. The student can be a school-age child, an adult preparing for a certification exam, or anyone wishing to learn materials, such as a foreign language. The educational tasks require the student to perform tasks that help him memorize and learn materials. These tasks can include requiring a student to answer questions on a variety of topics, or to perform timed readings, analytical computations, and other tasks that help him memorize and learn materials.

The host system can be almost any kind of electronic equipment, including a personal computer; a video game player; a television set that may or may not be connected to a set-top box; a video cassette recorder (VCR); a CD player; a DVD player; or any other system upon which a user can be required to perform educational tasks.

In operation, the student may be enjoying an user application on the host system. The user application may, for example, be a computer application such as a computer chess game, an Internet chat session, a music or video application, a video game played on a game player, or a television program viewed on a television set or on a computer configured to receive television programs. When a suspension criterion is met, the user application is suspended or paused (e.g., auto-paused) and the student is required to perform an educational task before the user application is resumed. In this way, the student is forced to perform an educational task before he is allowed to again enjoy the user application. As used herein, the term "suspend" means to suspend, pause, auto-pause, delay, place in the background, or manipulate an application in any way so that it is interrupted and can be resumed at a later time. The term "suspend" is not limited to any specific command, sequence of commands, system calls, or any other methods for interrupting a unit of execution on a particular operating system or in a particular environment. As used herein, the term "suspend" is used to describe suspending, pausing, auto-pausing, delaying, placing in the background, or manipulating an application running on a processor executing on any operating system or other environment.

The educational task may be, for example, that the user answer a question correctly; meet a minimum performance criteria, such as correctly answering a specified number of questions based on a prior reading (i.e., a reading comprehension test); correctly pronouncing words or phrases in a foreign language, where the user's response is considered correct if it approximates the correct word or phrase; reading at least a pre-determined number of words within a predetermined time; or completing at least a minimum number of educational tasks from a selected number of educational tasks.

The user application is suspended according to a suspension criterion. For example, the suspension criterion may be the elapse of a pre-determined amount of time since the last educational task, such as one hour, so that the student is required to perform an educational task once every hour. Alternatively, the suspension criterion may be the elapse of a random time period, or, if the host system is a television set, the suspension criterion may be the detection of the start of a television commercial. Alternatively, the suspension criterion can be the occurrence of a particular date and time. The frequency of the educational tasks can be wholly or partly dependent on a student's performance on past education tasks. As described in more detail below, the suspension criterion can be the occurrence of other events, which may vary over time.

In one embodiment, a testing system includes a testing application (executable code) and data used by the testing application, such as a database and one or more configuration files. When the testing application is run, the user is presented with a Testing graphical user interface (Testing GUI, FIG. 1), which in turn can be used to present a Configuration graphical user interface (Configuration GUI, FIG. 7). The testing application can also be used to access a Testing database (FIG. 5), which stores information presented though the Testing GUI.

The phrase "Testing GUI" as used herein is not intended to limit the types of tasks presented to a user. The Testing GUI can present tests that require the user to answer a question presented; it can present drills that require the user, for example, to read presented text within a given time limit and possibly answer questions related to the text; it can present foreign words and phrases, which the user must enunciate correctly within tolerable limits; or it can present other tests, drills, or tasks that help a user learn material.

The Testing GUI presents the student with the educational tasks, receives the student's responses, and informs the student whether he has submitted a correct or an incorrect answer. The Configuration GUI lets a parent, guardian, or teacher (a testing administrator) set parameters stored in configuration files used to configure the testing system. These configuration files may set the time intervals during which the student is presented with an educational task, or it may set the types of educational tasks that the student is presented with, including the topics and difficulty level of the educational tasks. In this way, a testing administrator can devise a lesson plan that the student must follow. This is helpful, for example, when the testing administrator determines that the student should concentrate on specific subjects having a specific difficulty level. It will be appreciated that the testing administrator may be the student when, for example, an adult or other responsible person wishes to test himself, as when an adult wishes to prepare himself for a certification exam or merely to learn a foreign language. Educational tasks and lesson plans can be based upon lesson plans previously presented to a student. Moreover, lesson plans can be devised so that educational tasks are apportioned among multiple subjects.

The Testing database stores the educational tasks that the student is presented. The Testing database may hold sets of questions and corresponding correct answers (question and answer pairs) on a variety of topics; it may contain text used in timed readings; and it may contain other information used to test a student's knowledge. The Testing database can be edited by the testing administrator to add, delete, or modify question and answer pairs or other information used for educational tasks.

In one embodiment of the present invention, when the user application is suspended, the testing application is moved to the foreground and run, thus presenting the student with the Testing GUI. Using the Testing GUI, the student can now access the testing system and select a topic that he would like to be tested on. The list of topics presented to the student may be stored in a configuration file. A testing administrator may determine, for example, that a student must focus on math and law, so the Testing GUI might only present the topics MATH and LAW, as described more fully below. The student can then select an educational task from the topics MATH and LAW.

When the student selects a topic that he is to be taught (such as, for example, by any combination of tests, drills, lessons, and the like), parameters in the configuration file determine the difficulty of the questions presented to him. The testing application then preferably selects a question from the Testing database having the selected topic with the appropriate difficulty level and presents it to the student through the Testing GUI. The student can now submit an answer to the question, request a hint, or request an easier question. If the student submits an answer through the Testing GUI, his answer is compared to an answer retrieved from the Testing database for the question presented (the answer in a question and answer pair, i.e., the "correct answer"). If the student's answer matches the correct answer, "CORRECT" is displayed on the Testing GUI and the user application is returned to the foreground and resumed. The educational task is now completed, and the student may resume the Internet session, video game, television program, or other user application that was suspended by the testing system. Preferably, the Internet session, video game, television program, or other user application is resumed at the point it was suspended or paused.

If the student's response does not match the correct answer, "INCORRECT" is displayed on the Testing GUI and the student is given another opportunity to submit an answer. The educational task will not be completed; the user application will not resume until the student has submitted a correct answer.

If the student asks for a hint, a hint to the question will be displayed on the Testing GUI. The student must now answer the question presented, or he may ask for an easier question. If the student asks for an easier question, the testing application will retrieve a question and answer from the Testing database having a difficulty level lower than that of the previously presented question or will retrieve a question and answer from the Testing database that the student has already answered correctly, thus reinforcing the student's knowledge of an answer. Again, the student may submit an answer to the question, request a hint, or request an easier question. The educational task will not be completed until the student submits a correct answer to the question presented.

Other embodiments of the present invention may present the student with other educational tasks. For example, a section of text may be presented to the student in the Testing GUI. The student may be required to read the text within a time limit, which might also be determined by a parameter in a configuration file. After the time limit has expired, the text will preferably be removed and replaced by one or more questions or drills related to the text and which the user must answer or perform. The question or drill can be a single question that the user must answer; a question and a set of multiple choice answers from which the user must select a correct answer; a comprehension drill, which requires that the user perform some task, such as correctly enunciating an English or foreign phrase found in the text; or any other number of questions, drills, or other educational tasks.

Alternatively, a section of text may be presented to the student in the Testing GUI. The student may be required to edit the text by deleting, adding, or rearranging words in the text so that the text is more concise or conforms to the rules of English grammar.

The testing system can also provide information about a student's performance. For example, it can provide a test score giving the percentage of educational tasks that the student performed correctly. A testing administrator can use these test scores and other information to gauge how well a student is learning educational materials.

In one embodiment, the testing application ensures that it cannot be deactivated or removed, except by the testing administrator. This protection may be accomplished in many ways. For example, the testing application may be "owned" by a user having higher privileges than those of the student. Thus, for example, a testing administrator may "own" the testing application and thus only users with privileges equal to or greater than his may disable the testing system. By ensuring that a student has lower privileges than a testing administrator, it can be assured that students cannot disable the testing system and therefore must solve educational tasks (i.e., satisfy a resumption criterion) before the user application is resumed.

The testing administrator has other privileges not granted to a student. For example, the testing administrator may use a passcode to bypass the testing system so that the host system is returned to the user application even if an educational task is not performed. This privilege is denied to the student, who must perform an educational task before being returned to the user application. In one embodiment, the student is denied access to any combination of the Task Manager, services (such as, for example, in a Windows™ Operating System environment), and operating system commands that would allow him to terminate the testing system and resume the user application, without performing an educational task. This may be accomplished, for example, by changing the access permissions of any combination of the Task Manager application, services, and operating system commands so that only the testing administrator can execute them.

FIG. 1 illustrates a computer terminal 110 displaying a Testing GUI 100 in accordance with one embodiment of the present invention. The Testing GUI 100 comprises a topic area 115, a question box 120, an answer box 125, and a control area 130. The topic area 115 contains topic buttons 115a-g, each of which displays a topic that the student can be tested on. In FIG. 1, the topic buttons 115a-g display the topics "Geography" 115a, "Foreign Language" 115b, "Math and Science" 115c, "Spelling" 115d, "History" 115e, "Law" 115f, and "Animal World" 115g. It should be apparent to those skilled in the art that these topics are exemplary and any other appropriate topics can be included in the topic area 115. The control area 130 contains control boxes 130a-f, each of which controls the operation of the testing system. In FIG. 1, the control area 130 contains a Submit button 130*a*, a Clear button 130*b*, an Options button 130*c*, a Hint button 130*d*, and an Easier button 130*e*.

In operation, when a student is first presented with the Testing GUI 100, the student chooses a topic by selecting the corresponding topic button. For example, if the student wishes to be tested on geography, he will select the Geography button 115*a*. He may do this by navigating his mouse so that it is over the Geography button 115*a*, and clicking a mouse button. A geography question can be selected in other ways, such as vocally, when a student speaks the word "geography" into a microphone coupled to the computer so that the computer translates the acoustical signals into digital signals corresponding to the selection "Geography." It will be appreciated that there are other methods using other input devices by which a computer can determine a student selection. It will also be appreciated that topics other than geography can be selected.

After the student has selected a topic, a question related to that topic will appear in the Questions box 120. The Testing GUI 100 illustrated in FIG. 1 shows the exemplary question "What is the capital of France?" being presented in the Question box 120. It will be appreciated that the question could be presented on other presentation devices, using other methods. For example, the question may be presented by playing a voiced recording on a speaker coupled with the computer system. The question may also be presented in other ways recognizable by the student.

The student may next enter his response in the Answer box 125. The Testing GUI 100 illustrated in FIG. 1 shows that the answer "Paris" has been entered into the Answer box 125. Once the student has entered an answer, he may submit it to the testing system by pressing the Enter key on a computer keyboard or by selecting the "Submit" button 130*a* in the control area 130. The student may select the "Submit" button by positioning his mouse pointer over the Submit button 130*a* and clicking a mouse button.

Alternatively, after entering text into the Answer box 125, the student may select the Clear button 130*b*, clearing the Answer box 125 of text. The student may now enter another answer into the Answer box 125 and submit it by selecting the "Submit" button 130*a*.

Alternatively, as described in more detail below, the student may also request an easier question by selecting the "Easier" button 130*e*. Or, he may ask for a hint to the question by selecting the "Hint" button 130*d*.

As described in more detail below, the testing administrator can limit the number of tries a student has to correctly answer a question or perform some other task or drill. For example, the testing administrator can set a parameter in a configuration file that limits the student to three tries to correctly answer a question. After three unsuccessful attempts to answer the question, the student is given some other question to answer or some other drill or lesson to perform. This restriction would require a student to think through his answer or response, rather than take an unlimited number of guesses that would not help him learn educational materials.

It will be appreciated that educational tasks may be presented and a student's responses entered using various interfaces. For example, the educational tasks may be presented using a textual display or a graphical user interface. The educational task may be presented on a speaker, used, for example, for visually-impaired students. Alternatively, the educational task may be presented using other presentation devices or any combination of presentation devices.

Likewise, student responses can be generated using a keyboard when, for example, the student is using a textual interface. The student response may also be generated using a mouse, when the student is using a graphical user interface. When the student response is generated using a graphical user interface, the student may be presented with a list of possible responses from which he can select one. A student response may be generated using a microphone when, for example, the student is disabled and unable to use a keyboard or a mouse or does not have access to a keyboard or a mouse. The microphone can be coupled with the computer, such that an acoustical signal is translated into digital signals that the computer recognizes as words. Alternatively, the student response can be generated using other input devices or any combination of input devices.

After the student has submitted an answer, the testing application reads it. If the answer is a correct answer, the student is notified that his answer was correct. The testing application is removed from the foreground and the user application that the student was using is returned to the foreground, resuming from where it was interrupted. Preferably, the testing application is placed in the background. If placed in the background, it will be returned to the foreground and run when a suspension criterion is met. For example, the suspension criterion may be the elapse of a pre-determined time interval such that the Testing GUI is presented to the student at the predetermined time interval.

Suspension criteria may be set, for example, in parameters saved in configuration files that the testing application reads, either when the testing application is first loaded into the host system, when the host system is first powered on, or when a testing application updates parameters in the configuration files. The testing administrator may update parameters in the configuration files by first selecting the "Options" button 130*c* in the control area 130 of the Testing GUI 100. The testing administrator may now be presented with a Configuration GUI (FIG. 7) which preferably challenges the testing administrator for a passcode. In this way, only the testing administrator may change the parameters used by the testing application.

Once the testing administrator has entered a correct passcode, he may now use the Configuration GUI to set parameters in one or more configuration files. These configuration files may store various parameters used by the testing system. For example, the configuration files may store parameters that determine (1) suspension criteria, such as the time intervals that must elapse before the testing system is placed in the foreground, requiring a student to perform an educational task; (2) the educational topics that are presented to a student, thus outlining a lesson plan; (3) the difficulty level of the questions presented to a student; and (4) the titles of educational software packages from third-parties that are compatible with the present invention and that include educational tasks and other materials that can be presented to a student. Each of these parameters is discussed in more detail below. It will be appreciated that many other parameters can be included in a configuration file, which determine, among other things, the educational tasks, the suspension criteria, etc., of the present invention.

Figure 2:
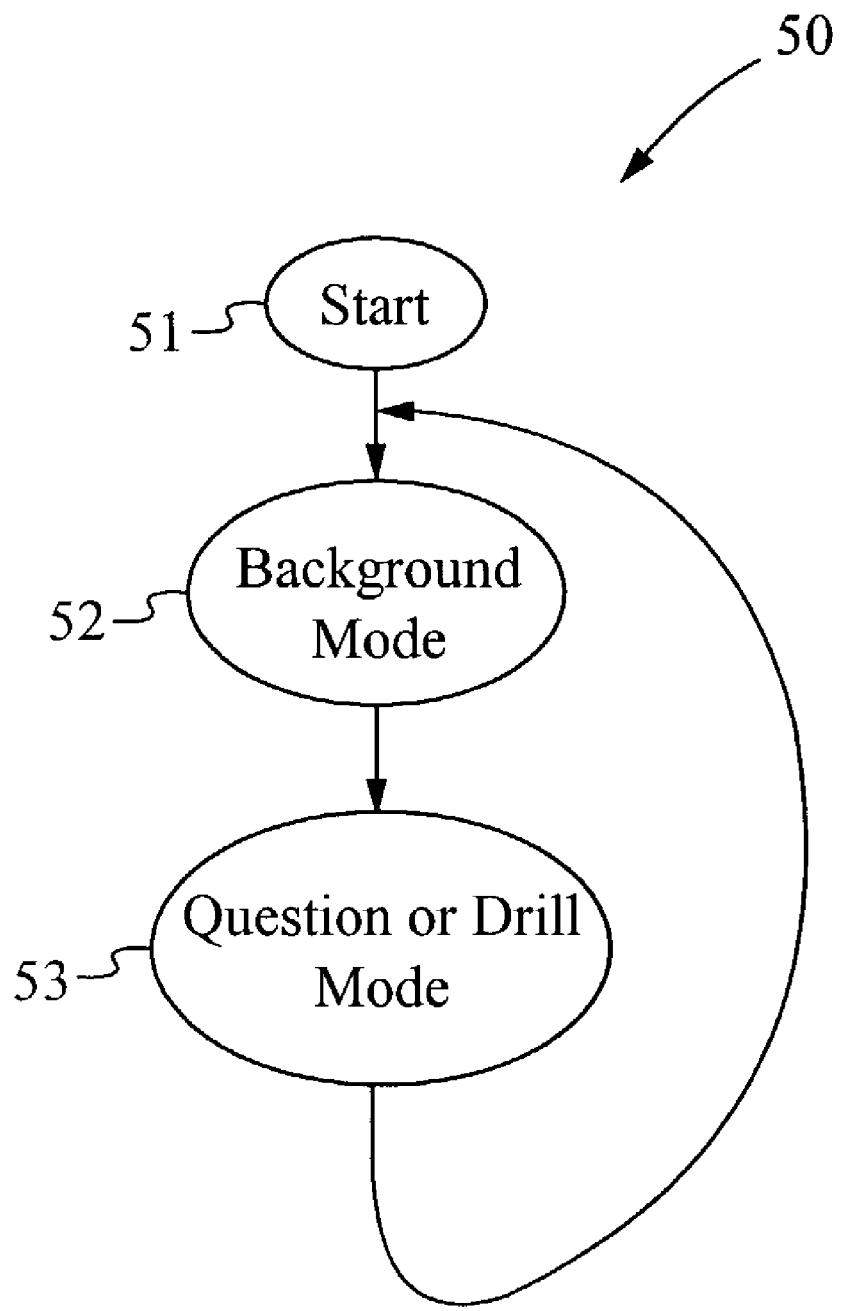
FIG. 2 is a state diagram of the testing system according to one embodiment of the present invention.

FIG. 2 is a state diagram illustrating the states of the testing application in accordance with one embodiment of the present invention. In a start state 51, the testing application executes on the host system, initializing data by, for example, reading configuration files that it needs to operate. The start state 51 may be entered when a host system is first powered on or when the testing application is first loaded onto the host system. For example, the testing system may read configuration data that determines when it is placed in the foreground, suspending other applications that may be running. The other applications are suspended by placing them in the background, pausing their execution, or interrupting or modifying their execution as described above. Also, in the start state, the testing system can mask interrupt signals so that it cannot be interrupted and thus bypassed. In addition, the testing system can be given a high priority so that it cannot be preempted by applications with lower priorities, such as primary (user and non-educational) applications that a student may run.

Next, the testing system goes into a background mode 52. Alternatively, as for example in the UNIX™ operating system environment, the testing system may use the SLEEP command to put itself to sleep for a given time, placing itself into the background. The time that it sleeps may be determined by a suspension criterion. The suspension criterion may determine that the testing system sleeps for a pre-determined time interval or for a random time interval computed by, for example, a function that computes a random number within an acceptable range. If the host system is configured to receive television signals, the suspension criteria may be that the host system detects the start of a television commercial. Alternatively, the testing system can be configured so that when the host system is first powered on, the testing system skips the background mode and enters the question mode (described below) so that the Testing GUI is automatically presented to the student. This corresponds to a sleep time of 0 seconds.

While the testing system is in the background mode, a user application can execute on the host system. If the host system is a television set or a set-top box, the user application can be a television program, a DVD movie, a cable program, or any other program viewable on a television monitor. If the host system is a video game player, the user application can be a video game. If the host system is a personal or laptop computer, the user application can be a computer game, Internet session, computer application, or any other application that can be presented on a computer.

Once the sleep time has elapsed, the testing application enters a question or drill mode 53. In the question or drill mode 53, the testing application executes, suspending the user application that was running in the foreground, and presenting the Testing GUI to the student, which displays an educational task. Preferably, the testing system does this by running in the foreground. Alternatively, the testing system may do this, for example, by sending a SUSPEND signal to all of the user applications running on the host system and having a priority less than its priority. The testing system can be configured to have a priority higher than all of the user applications running on the host system. If the testing system has a priority higher than all other user applications the student can be prevented from running other user applications while the testing application is running. While the testing application is running, the student is also prevented from opening or interacting with programs accessible from other windows. The student can resume the user application when a resumption criterion is met.

The resumption criterion may be that the student completes an educational task, which may be the supplying of the correct answer to one or more questions or the performance of a drill. Alternatively, the resumption criteria may be that a testing administrator (such as a parent or teacher) enters a passcode to the testing system. The resumption criterion may be that a predetermined time interval has elapsed. For example, if the testing system has been placed in the foreground but the host system has been idle for several days (or some other long period), the testing system may place itself in the background mode so that user applications may be enjoyed on the host system. Once the resumption criterion is met, the testing system returns to the background mode 52 by, for example, being placed in the background. Alternatively, the testing system can accomplish this by, for example, first sending a RESUME signal to all of the suspended processes, which resume executing from the point at which they received the SUSPEND signal. The testing system can then return to the background mode 52, by, for example, executing a SLEEP system call. The suspension criterion, invoking the testing application, will be met periodically so that a student is periodically presented with educational tasks. It will be appreciated that the testing system and any other application can be placed in the foreground or the background using many different commands, system calls, or other methods based on the environment that the testing system is run on.

In some embodiments, the suspension criterion can be altered when a student elects a question, drill, or other task more difficult than the one presented to him, and then successfully answers the question or performs the drill or task. For example, a suspension criterion may be that a user application is to be interrupted once every hour. When the student elects a question more difficult than the one presented to him and then correctly answers the question, the suspension criterion can be updated so that the user application is interrupted once every two hours. Thus, a student can be rewarded for attempting and successfully performing more challenging tasks.

In still other embodiments, the suspension criterion can vary over time. For example, a testing administrator may decide that a student should be tested more frequently, on more difficult questions or drills, or both as a target date (such as a final examination) approaches. For example, two weeks before a final examination the suspension criterion can determine that the user application is interrupted once every four hours so that the student is presented with a question or drill related to the final examination once every four hours. One week before the final examination, the suspension criterion can determine that the user application is interrupted once every hour. In addition, the questions presented or drills required may be more difficult than those presented two weeks before the final examination. One day before the final examination, the suspension criterion can determine that the user application is interrupted once every 30 minutes. In addition, the questions presented or drills required may be more difficult than those presented one week before the final examination. Thus, the student is prepared more and more thoroughly as the target date nears.

In still another embodiment, the testing administrator may allow a suspension criterion to be overridden. The testing administrator can set a parameter in a configuration file that allows a user application to continue executing even though a suspension criterion has been met. For example, the student may be transferring an important file to the host system. If the suspension criterion will be met in 30 seconds, the testing system may print to the screen, "WARNING: INTERRUPTION IN 30 SECONDS." The student may now notify the testing system that an important user application is running and should not be suspended; the file transfer is thus allowed to complete, uninterrupted.

Here, the suspension criterion can be handled in several ways. For example, the suspension criterion can be delayed so that the user application trying to execute immediately after the file transfer has completed, is suspended. Alternatively, the suspension criterion can be ignored until after the file transfer has completed. That is, the next time the suspension criterion is met, the currently running user application (not the file transfer) will be suspended. It will be appreciated that the suspension criterion can be handled in any number of ways.

Figure 3:
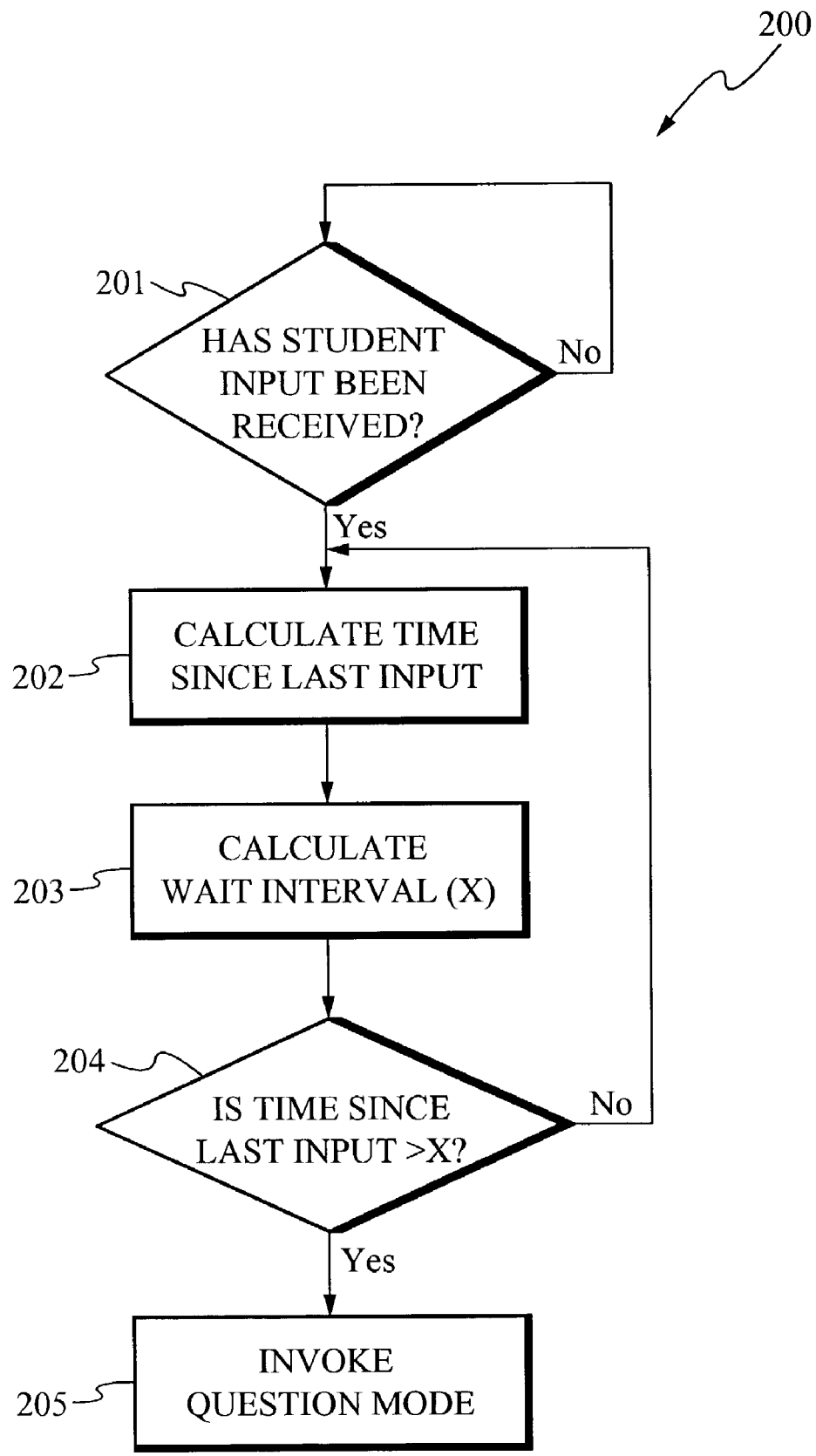
FIG. 3 illustrates a flow chart for determining when to display a testing interface according to one embodiment of the present invention.

FIG. 3 illustrates a flow chart 200 for the background mode 52 when the suspension criterion is the elapse of a pre-determined time interval, X. In the embodiment illustrated in FIG. 3, the testing application is originally in the background mode 52. In the background mode, the host system may execute a user application. The testing application will only suspend the user application when X time units have elapsed since the student's last input. The student's last input corresponds to the student's completing an educational task. When X time units have elapsed, the testing application enters the question mode, described in more detail below. Thus, the testing application is invoked every X time units, suspending the user application. It will be appreciated that X can be a varying time unit when, for example, the suspension criterion is the elapse of a random time interval.

Referring to FIG. 3, in the step 201, the testing application checks whether a student has input a response to a question or drill. If the student has not input a response, the testing application loops back to the step 201, until the student does input a response. Once the student has input a response, the testing application then continues to the step 202. In the step 202 the testing application calculates the time since the last student input, corresponding, for example, to the student's submission of a correct response to an educational task. In the step 203 the testing application calculates the wait interval (X) and in the step 204 compares the time since the last student input with the wait interval. If the time since the last student input is less than the wait interval, the testing application returns to the step 202. Otherwise, if the time since the last student input is greater than the wait interval, the testing application goes to the step 205, in which it enters the question mode. As described above, in the question mode, the testing application preferably is placed in the foreground. As one example, the testing application can AWAKEN from a SLEEP call. The testing system will then present the student with the Testing GUI. It will be appreciated that the testing application can be placed in the foreground using many commands, system calls, or other methods based on the operating system or other environment that the testing system is being run on.

As described above, suspension criterion other than the elapse of a time interval can be used. For example, a suspension criterion can be the reception of a television or program commercial. This can be accomplished in many ways. For example, a host system can be configured to trigger an interrupt signal when it detects the start of a television commercial. The start of a television commercial may be identified, for example, by information that broadcast stations generally insert in television broadcasts to indicate where local stations can insert television commercials or other advertisements. When a host system identifies the start of a television commercial, it can generate an interrupt signal, which invokes an interrupt service routine. The interrupt service routine may then call the testing application as described above. Those skilled in the art will recognize many other ways to identify a television or other program commercial and then invoke the testing application.

Figure 4:
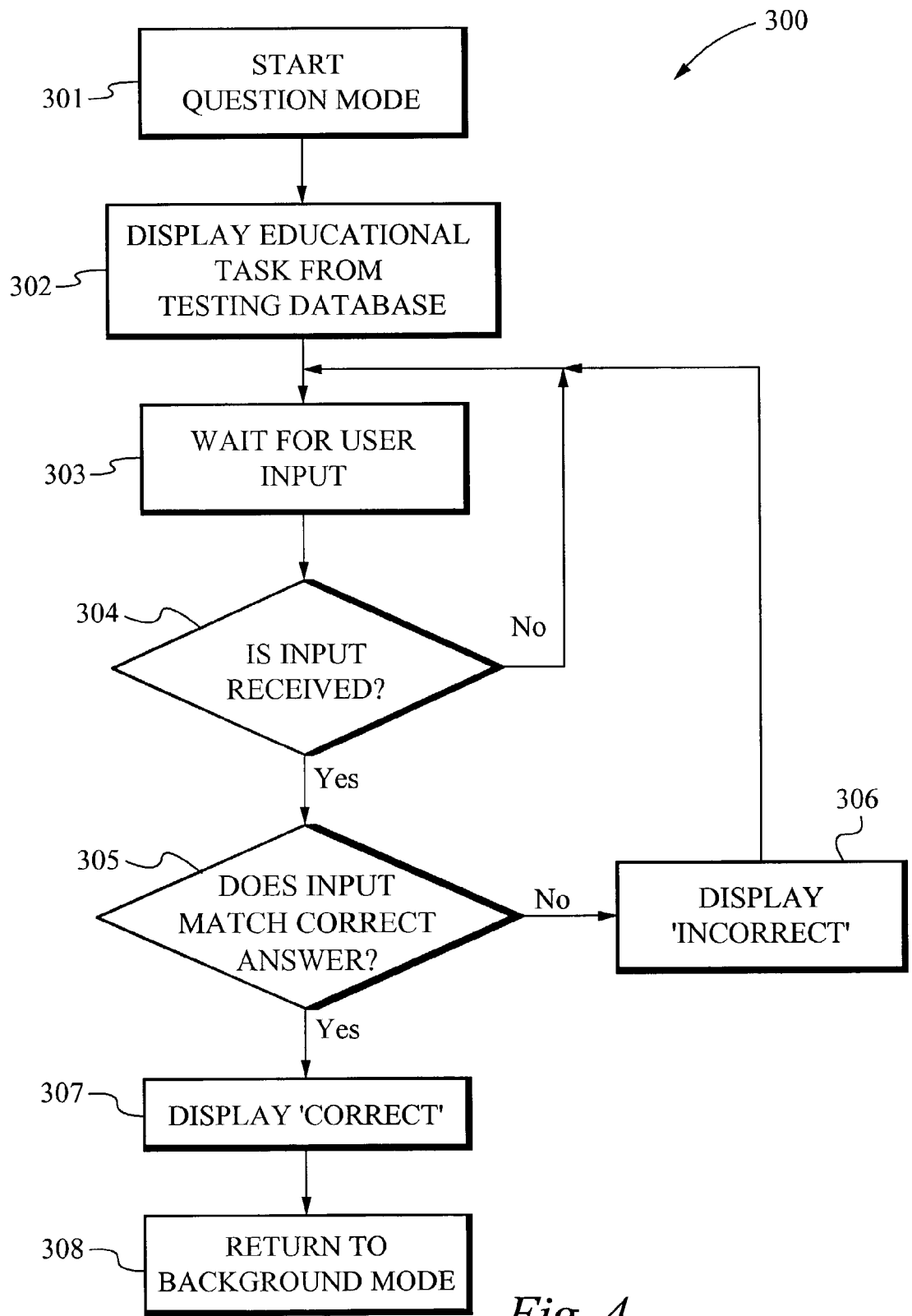
FIG. 4 illustrates a flow chart for reading in a user response and determining whether the response is correct.

FIG. 4 illustrates a flow chart 300 for the question mode 54 described in FIG. 2. In the step 301, the testing application starts the question mode. In the step 302, the testing system displays an educational task. At this point, the testing system may retrieve a question and answer pair from the Testing database. The educational task (e.g., the question in a question and answer pair) will be displayed in the Testing GUI 100, illustrated in FIG. 1. In the step 303, the testing application waits for student input, and in the step 304, checks whether it has received student input. If the testing application has not received student input, it returns to the step 303. If the testing application has received student input, it then proceeds to the step 305, where it compares the student input to a correct answer (e.g., the answer from a question and answer pair) from the Testing database. If the testing application receives (e.g., a student has submitted) a correct answer, it proceeds to the step 307 where it displays the word "CORRECT" on the Testing GUI and then, in the step 308, returns to the background mode. The user application will then be unsuspended and thus returned to the foreground. If, in the step 305, the testing application does not receive a correct answer, it proceeds to the step 306, where it displays the word "INCORRECT" on the Testing GUI and then proceeds to the step 303.

The testing system will now be described in more detail in relation to the question mode. Referring again to FIG. 4, in the question mode a student is prompted with a question, as illustrated in the step 302. For example, the question "Who was the first president of the United States?" may be presented in the Question box 120 on the Testing GUI 100 of FIG. 1. The testing application will next wait for student input in the step 303 and check the input in the step 304. From the Testing GUI, the student may, for example, enter the name "Thomas Jefferson" in the Answer box 125 and submit the name by clicking on the "Submit" button, as shown in FIG. 1. In the step 305, the testing application compares the submitted answer "Thomas Jefferson" with the correct name "George Washington" (the answer in the question and answer pair) retrieved from the Question and Answer database illustrated in FIG. 4. Because the submitted answer does not match the correct answer, the testing application proceeds to the step 306 so that the word "INCORRECT" is displayed in the Answer box 125. The testing application now returns to the step 303.

At the step 303, the testing application again waits for a student input, and at the step 304 again checks that the student input has been received. If the student now enters the correct name "George Washington" and submits it by clicking on the "Submit" button as shown in FIG. 1, the testing application proceeds to the step 305. In the step 305 the testing application compares the submitted answer "George Washington" with the correct answer "George Washington," which is stored, for example, in the Default Question and Answer module 401 in the Question and Answer database 400 illustrated in FIG. 4. Because the submitted answer matches the correct answer, the testing application proceeds to the step 307, in which the word "CORRECT" is displayed in the Answer box 125. The testing application proceeds to the step 308, in which it is returned to the background mode. The user application, which the user had been using, is now resumed.

As described above, it will be appreciated that the testing system may receive input from one of many input devices, including, but not limited to, a keyboard, a mouse, and a microphone. Similarly, the testing system may display messages such as those displayed in the steps 302, 306, and 307, on a multitude of presentation devices such as computer display monitors, game monitors, and speakers. In addition, the testing system may receive data on a plurality of input devices, such as a keyboard, a mouse, and a microphone.

Those skilled in the art will recognize other ways for periodically invoking a testing application. For example, a testing system may use a cron file, used on many UNIX™-compatible systems, and containing a list of files to be executed and the time of day they are to be executed. Thus, a testing administrator may include a cron file in a host system, specifying the time of day that the testing application is to be invoked. Of course, the testing application may also be invoked by other independent programs running on the host system. It will be appreciated that there are other ways of periodically executing a testing application.

Figure 5:
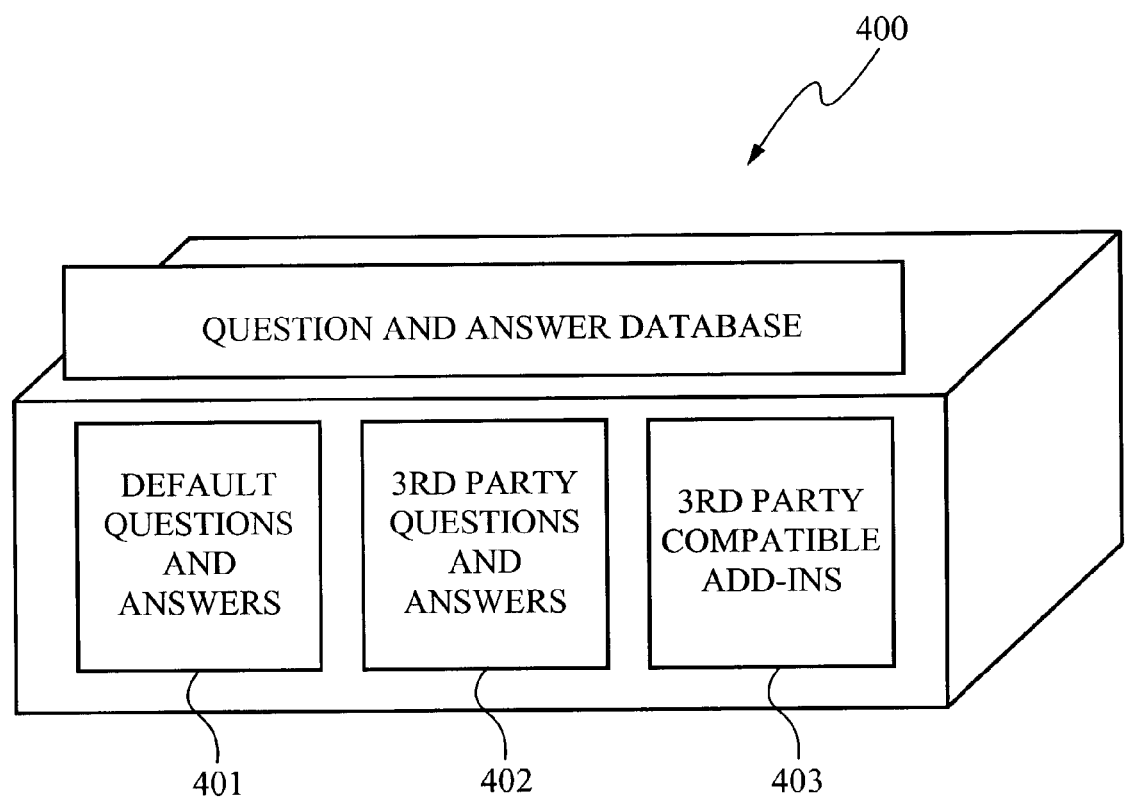
FIG. 5 illustrates a high-level overview of a database containing question and answer pairs and third-party components according to one embodiment of the present invention.

FIG. 5 depicts a Testing database illustrated as Question and Answer database 400, in which is stored the questions presented to a student in the step 302 of FIG. 4 and the corresponding correct answers (question and answer pairs) matched against the student input in the step 305. The Question and Answer database 400 may take one of may forms. For example, the Question and Answer database 400 can be a flat-file database, in which questions and answer pairs, and other data are separated by delimiters. Alternatively, the Question and Answer database 400 can be a relational database, composed of multiple, related tables. A relational database can be organized in many different ways. For example, a relational database can be organized so that each question and answer pair for each topic, regardless of difficulty level, are stored in one table. Alternatively, a relational database can be organized so that question and answer pairs for a given topic and having the same difficulty level are stored in one table. It will be appreciated that in accordance with the present invention, question and answer pairs can be stored in a relational database using many different organizational schemes.

FIG. 5 illustrates one embodiment of a high-level overview of a Question and Answer database 400, which comprises a Default Questions and Answers module 401, a Third-Party Questions and Answers module 402, and a Third-Party Compatible Add-Ins module 403. The Default Questions and Answers module 401 is originally supplied with the Question and Answer database 400. As described below, a testing administrator can edit this file to alter, add, or delete question and answer pairs in the Question and Answer database 400. The Third-Party Questions and Answers module 402 contains question and answer pairs not originally supplied with the Questions and Answer database 400. The testing administrator may, for example, find a third-party package that contains question and answer pairs that the testing administrator would like to include as part of the educational tasks presented to a student. In one embodiment, the Third-Party Questions and Answers module 402 remains as a module separate from the Default Questions and Answers module 401 so that it can easily be uninstalled. In another embodiment, the Third-Party Questions and Answers module 402 may be combined with the Default Questions and Answers module 401 to form a single table or collection of tables that form a relational database or a flat-file database.

Third-Party compatible Add-Ins are other files that the testing system can use to present educational materials to the student. These files may contain information other than question and answer pairs. These files may, for example, contain (1) a section of text that the student is required to read within a given time and (2) questions and answer pairs relating to the text. Of course, the Third-Party Compatible Add-Ins can contain other educational information that the testing system presents to the student to help him learn and memorize materials.

In sum, the testing system can make use of third-party data files, third-party applications, and other third-party files. The testing system can use these files to present a student with supplemental foreign language pronunciation drills, English reading comprehension drills, English reading drills, additional question and answer pairs, and the like. The testing system can thus seamlessly incorporate compatible tools to supplement the educational tasks available to a student.

Figure 6:
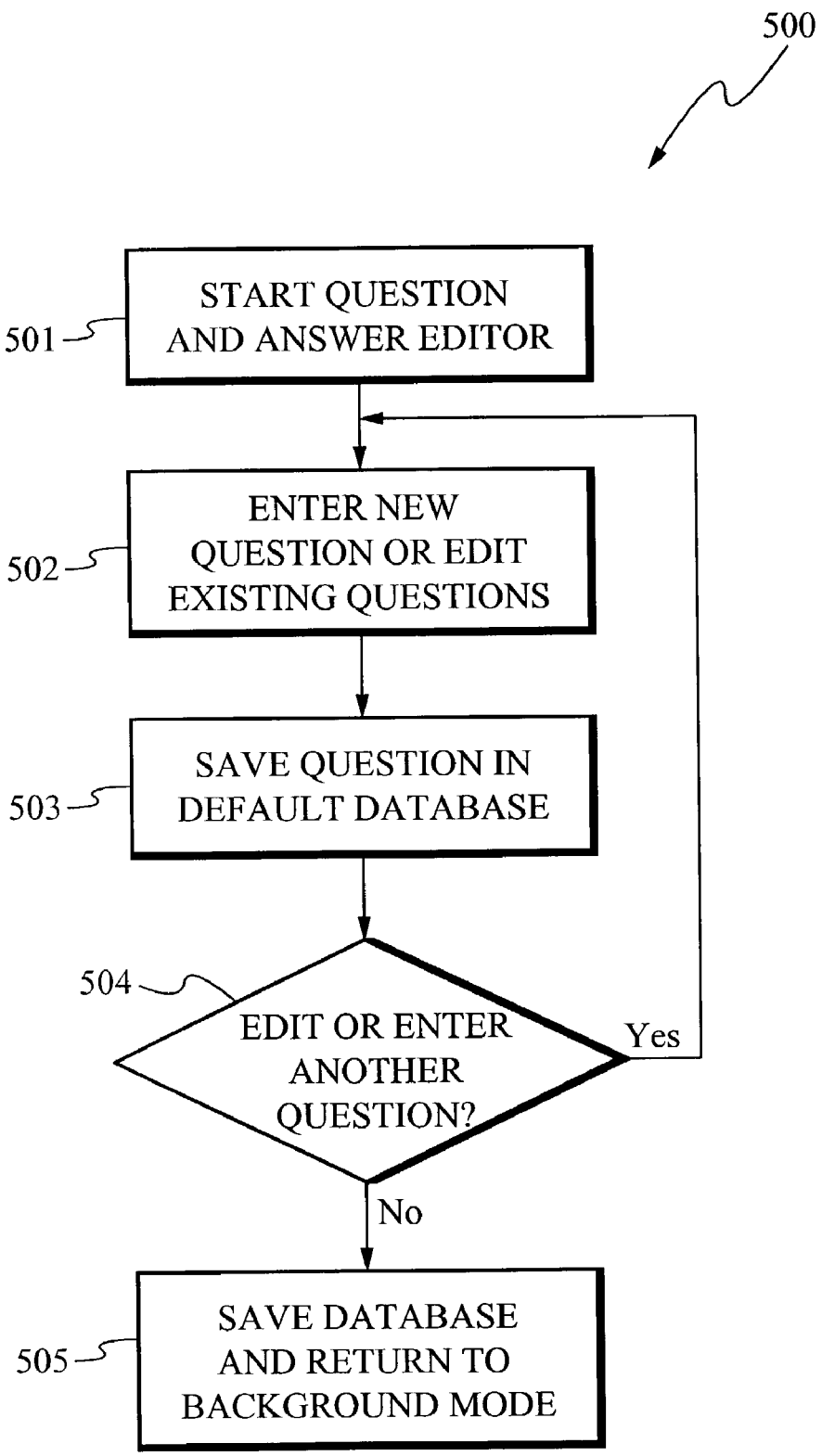
FIG. 6 illustrates a flowchart illustrating steps for updating a database of question and answer pairs according to one embodiment of the present invention.

FIG. 6 illustrates a flow chart 500 for editing the Default Question and Answer module 401. In the step 501 the testing administrator starts the Question and Answer editor. Next, in the step 502, the testing administrator enters a new question and answer pair or edits an existing question and answer pair. For example, if the Question and Answer database 400 is a flat-file database, the Question and Answer Editor can be used to open the file, edit a line containing a question and answer pair, add a line containing a new question and answer pair, or delete a line containing a question and answer pair. Alternatively, if the Question and Answer database 400 is a relational database, the Question and Answer Editor can be used to update a record containing a question and answer pair, insert a record containing a new question and answer pair, or delete a record containing a question and answer pair. It will be appreciated that the Default Questions and Answers database may be other types of databases that can be updated using other commands and formats, or may be a database in other formats, such as an encrypted or compressed format.

Next, in the step 503, the question and answer pair are saved in the Default Question and Answer module 401. This may be accomplished in different ways, depending on the type of database. For example, if the Default Question and Answer module 401 is a flat-file database, the Question and Answer Editor may save the flat-file database using a simple save command found in most editors. Alternatively, if the Default Question and Answer module 401 is a relational database such as an Oracle Tm relational database, the Question and Answer Editor may use a "COMMIT" command to store an updated record containing a question and answer pair to the Question and Answer database.

Next, in the step 504, the testing administrator can choose to edit another question and answer pair in the Default Question and Answer module 401. If the testing administrator decides to edit another question and answer pair in the Default Question and Answer module 401, the testing application returns to the step 502; otherwise, the Question and Answer editor proceeds to the step 505, in which the Testing database is saved and the testing application is returned to the background mode.

One embodiment for selecting and organizing question and answer pairs will now be described when the Testing database is a relational database. Tables in the database may, for example, have fields labeled TOPIC, QUESTION_NO, QUESTION, ANSWER, DIFFICULTY, HINT, and ASKED. The field TOPIC will contain a string designating a topic, such as "GEOGRAPHY" or "MATH and SCIENCE". The QUESTION_NO field may contain a number designating the number of the question for that topic and difficulty level, as described below. The QUESTION field may contain a string designating the question to be asked; this string may be displayed in the Question box 120, as described in the step 302 in FIG. 4.

The ANSWER field may contain a string designating the answer for the question in the QUESTION field (e.g., the answer in a question and answer pair). The DIFFICULTY field may contain an integer designating a difficulty level for the question in the QUESTION field. For example, larger integers may designate more difficult questions. Alternatively, the DIFFICULTY field may contain a string, with one part designating the grade-level of the question, and another part designating the difficulty-level for that grade. Thus, for example, the string "7-1" may designate a seventh-grade level question with a difficulty level of one (the lowest difficulty level for a seventh grader, corresponding to the easiest question). The HINT field may contain a hint to help the student answer the question.

Finally, the ASKED field may contain an integer or other identifier designating whether the question has been asked before. Originally, the ASKED field may contain the integer 0, indicating that the question has not yet been asked. Once the question has been asked, the ASKED field may be updated to contain the integer 1. The testing application may use this field to ensure that the same question is not asked repeatedly. After a given time limit, or after all of the questions in a given TOPIC and DIFFICULTY level have been asked, the testing application may reset the ASKED field for all the QUESTIONS with that topic and difficulty level to 0.

FIG. 7 illustrates one example of a record 700 in the Question and Answer database 400. The record 700 has a TOPIC field 710*a* containing the string "SCIENCE"; a QUESTION_NO field 710*b* containing the integer 1; a QUESTION field 710*c* containing the string "Hydrogen and what other molecule combine to form water"; an ANSWER field 710*d* containing the string "Oxygen"; a DIFFICULTY field 710*e* containing the string "7-2", which corresponds to the second-easiest level of question for a seventh grader; a HINT field 710*f* containing the string "It starts with the letter 'O'"; and an ASKED field 710*g* containing the integer 1, indicating that the question has already been asked. It should be noted that the underlined items in FIG. 7—TOPIC, QUESTION_NO, QUESTION, ANSWER, DIFFICULTY, HINT, and ASKED—are shown for ease of illustration and are not part of the record 700.

In operation, a student may select the TOPIC of SCIENCE and a DIFFICULTY level for the least advanced seventh grader ("7-1"). The student may select the topic from the topic area 115 of the Testing GUI 100, as illustrated in FIG. 1. The difficulty level may be set by the testing administrator using a Configuration GUI. The testing application may thus formulate a query to the Testing database (such as a relational database) to select all records for which the TOPIC field contains the string "SCIENCE", the DIFFICULTY field contains the string "7-1 ", and the ASKED field contains the integer 0 (e.g., the question has not been asked yet). The query may return a group of records, from which one will be chosen and whose string in its QUESTION field will be displayed in the Question box 120. If the student's response entered in the Answer box 125 matches the string contained in the ANSWER field of the selected record, the Testing GUI will display the string "CORRECT" in the Answer box 120; otherwise, the testing GUI will display the string "INCORRECT" in the Answer box 125. Once the question has been asked, the system will update the record so that the ASKED field contains the number 1, indicating that the question has been asked. If, for example, all of the questions for a given TOPIC and DIFFICULTY level have been asked (i.e., all of their ASKED fields contain the integer 1), then the testing application may update all of the records so that their ASKED fields all contain the integer 0. All of the questions in that topic with the given difficulty level may now be asked again.

In another embodiment, the educational task may consist of answering more than one question correctly. For example, the resumption criterion may be that the student answer two questions correctly. That is, the student may have to answer two questions correctly before the non-educational (primary) application is placed in the foreground and resumed. Alternatively, the resumption criterion may be that the student answer two question having designated topics and difficulty levels. For example, the testing administrator may determine that the student needs to concentrate on the topics "Math and Science" and "Law." Accordingly, the student may have to answer a pre-determined number of questions having a TOPIC field that contains the string "Math and Science" and a pre-determined number of questions having a TOPIC field that contains the string "Law" before the non-educational application is resumed. As described above, parameters in configuration files described above may, for example, set the difficulty level of the questions presented to the student; the topics presented to the student, which can determine a lesson plan; and the frequency with which questions are presented to the student.

FIG. 8 illustrates a computer monitor 110 displaying one embodiment of a Configuration GUI 150 used to set parameters in a configuration file. The Configuration GUI 150 can be accessed by selecting the Options button 130*c* from the Testing GUI 100 illustrated in FIG. 1. The Configuration GUI 150 contains a configure area 160. The configure area 160 contains a constant interval selection area, preferably comprising a radio button 161, a frequency text area 162, and an interval pull-down menu 163. In operation, when a testing administrator selects the radio button 161, the testing application will be placed in the foreground a given number of times (determined by the number in the frequency text area 162) in each time interval (determined by the interval selected in the pull-down menu 163). The example shown in FIG. 8 illustrates that the testing application will be placed in the foreground once each week. It will be appreciated that other time intervals could be chosen. For example, when the number 7 is entered into the frequency text area 162, the testing application will be placed in the foreground at constant time intervals, seven times each week (e.g., once every 24 hours).

Alternatively, the pull-down menu 163 can be selected to choose a different time interval. For example, the pull-down menu 163 can be used to select a time interval of a second, a minute, an hour, a day, a week, a month, or any other time interval. Thus, for example, if the pull-down menu 163 is used to select a time interval of one hour and the frequency text area 162 contains the number 1, then the testing application will be placed in the foreground once every hour.

Alternatively, if the radio button 165 is selected, the testing application will be placed in the foreground at random time intervals.

Preferably, the configuration area 160 also contains the text "Maximum Number of Tries" and a corresponding Tries text area 164. The number entered into the Tries text area 164 determines the maximum number of consecutive incorrect answers a student can supply to one question before he is required to answer another question. As illustrated in FIG. 3, the number 3 is entered into the Tries text area 164. Accordingly, the student must answer a question with three or fewer attempts. If, after three attempts, the student has not successfully answered a question, he is given a different question to answer. At a later time, the student may again be presented with the question that he was unable to answer correctly. It will be appreciated that a number larger or smaller than three can be entered into the Tries text area 164. Entering the number 0 into the Tries text area 164 may, for example, indicate that the student has an unlimited number of attempts to correctly answer one question.

The Configuration GUI 150 also preferably contains a categories area 170, which contains the categories (topics) presented to the student in the topic area 115 of the Testing GUI 100. The testing administrator can add and remove categories presented to the student in the topic area 115. For example, through the Configuration GUI 150, the testing administrator can add a category presented to the student by positioning a mouse to highlight text indicating a category to be added, and then clicking the "Add new" button 171. Alternatively, the testing administrator can remove a category presented to the student in the topic area 115 by positioning a mouse to highlight text indicating a category to be removed, and then clicking the "Remove" button 172. The testing administrator can also click on the "Move up" button 173 to sequentially move up the list of topics in the categories section 170, highlighting each one in turn; or he can click on the "Move down" button 174 to sequentially move down the list of topics in the categories section 170, highlighting each one in turn. The testing administrator can then add or remove those topics that are highlighted.

The Configuration GUI 150 also allows the testing administrator to select the type of task interface that the student can use to receive and answer educational tasks presented on the Testing GUI 100. For example, when the "Typed" radio button 180 is selected, the Testing GUI can present and receive typed data (e.g., questions and answers) from, for example, a keyboard; when the "Spoken" radio button 181 is selected, the Testing GUTI can present and receive spoken data from, for example, a microphone and speaker; and when the "Graphical" radio button 182 is selected, the Testing GUI can present and receive graphical data from, for example, a graphical user interface. It will be recognized that data can be presented to and received from the student using other interfaces.

The Configuration GUI also allows the testing administrator to set the difficulty level of the educational tasks presented to the student. The testing administrator can do this by entering a difficulty level in the Difficulty text area 168. FIG. 8 illustrates that the phrase "7-1 " has been entered into the Difficulty text area 168, indicating that the educational tasks presented to the student will be at the seventh grade level, with the lowest difficulty level. It will be appreciated that other difficulty levels could be entered into the Difficulty text area 168.

When the testing administrator has entered the parameters that determine the type of educational tasks presented to the student, the frequency with which the educational tasks are presented, the difficulty level of the educational tasks, and the task interface (e.g., typed, spoken, or graphical), he may save the parameters by clicking on the "Ok" button 166, or he may cancel what he has entered so that he can insert different parameters by clicking on the "Cancel" button 167. By clicking on the "Ok" button 166, the parameters are saved in one or more configuration files used by the testing system. The window to the Configuration GUI is now closed and the testing application placed in the background mode. The testing application will now use the saved parameters in the configuration files to determine when the testing application is placed in the question mode (e.g., placed in the foreground), the topics presented to the student, the difficulty level of the educational tasks, and the task interface types (e.g., typed, spoken, or graphical).

Other embodiments of the Configuration GUI determine that the testing application will be executed when the host system receives a television commercial. It will be appreciated that the Configuration GUI can be used to set other suspension and resumption criteria.

It will be appreciated that the educational tasks may include tasks other than answering questions. For example, the educational task may require editing a sentence to correct grammar errors. It may require deleting words from a sentence to make the sentence more concise. Or it may require other tasks that facilitate a student's memorization and learning of information.

It will be readily apparent to one skilled in the art that other various modifications may be made to the embodiments without departing from the spirit and scope of the invention as defined by the appended claims.

We claim:

1. A method of suspending a primary application so that a user must perform an educational task, the method comprising:
   a. suspending a first primary application program at a first execution point on an electronic device based on suspension criteria using a suspension program separate from the primary application program;
   b. presenting on the electronic device an educational task from a set of educational tasks, wherein the educational task is presented by a second application;
   c. receiving a user-generated response on an input device;
   d. repeating steps b and c until a resumption criterion is met; and
   e. resuming the first primary application from the first execution point.

2. The method of claim 1, wherein the suspension criteria also comprise an elapse of a pre-determined time interval.

3. The method of claim 1, wherein the suspension criteria also comprise an elapse of a random time interval.

4. The method of claim 1, wherein the suspension criteria also comprise the detection of a start of a television commercial.

5. The method of claim 1, wherein the suspension criteria also comprise the occurrence of a pre-determined date.

6. The method of claim 1, wherein the suspension criteria also comprise the occurrence of a pre-determined time.

7. The method of claim 1, wherein the suspension criteria also comprise the elapse of a variable time interval.

8. The method of claim 7, wherein the variable time interval varies in relation to a difference between a present date and a pre-determined date.

9. The method of claim 1, wherein a difficulty level of the education task varies in relation to a difference between a present date and a pre-determined date.

10. The method of claim 1, wherein the educational task is an educational question.

11. The method of claim 1, wherein the resumption criterion is that a passcode has been entered on an input device.

12. The method of claim 1, wherein the resumption criterion is that the user-generated response matches a correct response.

13. The method of claim 12, wherein a correct response is configurable.

14. The method of claim 12, further comprising presenting to a user information about a correct response.

15. The method of claim 12, wherein the user response is a request for an educational task having a difficulty level different from that of the educational task presented.

16. The method of claim 12, further comprising presenting the user with a user score determined by a number of correct responses supplied by a user and a number of responses to educational tasks submitted by the user.

17. The method of claim 1, wherein the resumption criterion is the completion of a minimum performance criterion.

18. The method of claim 17, wherein the minimum performance criterion is a reading of at least a minimum number of sentences within a pre-determined time.

19. The method of claim 17, wherein the minimum performance criterion is correct or approximately correct pronunciation of a non-English text.

20. The method of claim 17, wherein the minimum performance criterion is completion of at least a pre-determined minimum number of educational tasks from a selected number of educational tasks.

21. The method of claim 1, wherein the resumption criterion is that a pre-configured time limit has elapsed.

22. The method of claim 1, wherein the set of educational tasks can be configured by a user.

23. The method of claim 1, wherein presenting an educational task comprises:
   a. presenting a user with a list of possible educational task subjects;
   b. receiving a user subject response; and
   c. presenting the educational task based on the user subject response.

24. The method of claim 1, wherein a set of questions in a given category is determined by a configurable difficulty level.

25. The method of claim 1, further comprising suspending a second application program at a second execution point based on the suspension criteria and resuming the second application program from the second execution point when the resumption criterion is met.

26. The method of claim 1, further comprising:
   comparing a first priority of the first primary application with a second priority of a module that suspends the first primary application; and
   suspending the first primary application if the first priority is higher than the second priority.

27. A method of suspending a user application to test a user's knowledge with an educational task, the method comprising:
   a. running a primary application program on an electronic device;
   b. suspending operation of the primary application program triggered external to the primary application program based on suspension criteria;
   c. running a secondary application program on the electronic device until a resumption criterion is met, wherein the secondary application program presents multiple subject areas each corresponding to an educational task;
   d. presenting to a user an educational task from a subject area selected by a user, the subject area from the multiple subject areas; and
   e. resuming operation of the primary application program.

28. The method of claim 27, wherein the primary application is suspended at an execution point based on a suspension criterion.

29. The method of claim 28, wherein the suspension criterion is an elapse of a configurable time interval.

30. The method of claim 28, wherein the suspension criterion is an elapse of a random time interval.

31. The method of claim 28, wherein the suspension criterion is a detection of a start of a television commercial.

32. The method of claim 27, wherein the resumption criterion is providing an answer to an educational question from a subject area selected by a user.

33. The method of claim 27, wherein the resumption criterion is that a passcode has been entered on an input device.

34. The method of claim 27, wherein the resumption criterion is that a user-generated response matches a correct response.

35. The method of claim 34, wherein the correct response is configurable.

36. The method of claim 34, further comprising presenting to a user information about a correct response.

37. The method of claim 34, wherein the user-generated response is a request for an educational task having a difficulty different from that of the educational task presented.

38. The method of claim 27, wherein the resumption criterion is that a pre-determined time limit has elapsed.

39. The method of claim 27, wherein the set of educational tasks is configurable.

40. The method of claim 27, wherein presenting an educational task comprises
   a. presenting a user with a list of possible educational task subjects;
   b. receiving a user subject response; and
   c. presenting the educational task based on the user subject response.

41. The method of claim 27, further comprising presenting the user with a user score determined by a number of correct responses supplied by a user and a number of responses to educational tasks submitted by the user.

42. The method of claim 27, wherein the educational task presented to the user is determined by a configurable difficulty level.

43. The method of claim 27, wherein the primary application program is a computer application program.

44. The method of claim 27, wherein the primary application program is an Internet session.

45. The method of claim 27, wherein the primary application program is a televised program.

46. The method of claim 27, wherein the primary application program is a computer game.

47. The method of claim 27, wherein the primary application program is a visual presentation.

48. The method of claim 27, wherein the primary application program is a sound presentation.

49. The method of claim 27, further comprising transmitting a suspension signal to all user applications executing on the electronic device and having a priority higher than a priority of the primary application.

50. A teaching device for execution on a host system, the host system executing a first primary application and an interactive application, the teaching device comprising:
   a. means for suspending operation of the first primary application program on the host system, wherein the means for suspending is configured to suspend multiple pre-defined application programs;
   b. means for executing the interactive educational application on the host system until a resumption criterion is met; and
   c. means for resuming operation of the first primary application on the host system when the resumption criterion is met.

51. The teaching device of claim 50, wherein the interactive educational application presents a question on a presentation device and receives an answer from an input device.

52. The teaching device of claim 51, wherein the presentation device is an image display.

53. The teaching device of claim 51, wherein the presentation device is a sound system.

54. The teaching device of claim 51, wherein the input device is a computer keyboard.

55. The teaching device of claim 51, wherein the input device is a computer mouse.

56. The teaching device of claim 51, wherein the input device is a microphone.

57. The teaching device of claim 51, wherein the input device is a wireless communication system.

58. The teaching device of claim 51, wherein the resumption criterion is that the user provides a correct response to the question according to a constraint.

59. The teaching device of claim 58, wherein the constraint is that the correct response be provided within a configurable time limit.

60. The teaching device of claim 50, wherein the host system is configured to display images.

61. The teaching device of claim 50, wherein the host system is configured to generate sound.

62. The teaching device of claim 50, wherein the host system is a television set.

63. The teaching device of claim 50, wherein the host system is a set-top box.

64. The teaching device of claim 50, wherein the first primary application is a video game.

65. The teaching device of claim 50, wherein the first primary application is an Internet session.

66. The teaching device of claim 50, wherein the first primary application is a computer application.

67. The teaching device of claim 50, wherein the first primary application is a televised program.

68. The teaching device of claim 50, wherein the first primary application is a video game.

69. The teaching device of claim 50, wherein the means for suspending the first primary application is further configured to suspend a second primary application at a second execution point and the means for resuming the first primary application is further configured to resume the second primary application from the second execution point when the resumption criterion is met.

70. A teaching device for execution on a host system, the teaching device comprising a computer-readable medium having computer-executable instructions thereon for controlling operation of the host system, the computer-readable medium comprising:
   a. a suspension module programmed to suspend operation of an initial application on the host system by transmitting a suspend signal configured to suspend the initial application and at least one other application;
   b. an execution module programmed to execute an interactive educational application on the host system until a resumption criterion is met; and
   c. a resumption module programmed to resume the initial application from the execution point on the host system when the resumption criterion is met.

71. The teaching device of claim 70, wherein the interactive educational application presents a question on a presentation device and receives an answer from an input device.

72. The teaching device of claim 71 wherein the presentation device is an image display.

73. The teaching device of claim 71, wherein the presentation device is a sound system.

74. The teaching device of claim 71, wherein the input device is a computer keyboard.

75. The teaching device of claim 71, wherein the input device is a computer mouse.

76. The teaching device of claim 71, wherein the input device is a microphone.

77. The teaching device of claim 71, wherein the input device is a wireless communication system.

78. The teaching device of claim 71, wherein the resumption criterion is that the answer is a correct response.

79. The teaching device of claim 70, wherein the host system is a configured to display images.

80. The teaching device of claim 70, wherein the host system is configured to generate sound.

81. The teaching device of claim 70, wherein the host system is a television set.

82. The teaching device of claim 70, wherein the host system is a set-top box.

83. The teaching device of claim 70, wherein the initial application is a video game.

84. The teaching device of claim 70, wherein the initial application is an Internet session.

85. The teaching device of claim 70, wherein the initial application is a computer application.

86. The teaching device of claim 70, wherein the initial application is a televised program.

87. The teaching device of claim 70, wherein the initial application is a video game.

88. The teaching device of claim 70, wherein the initial application is suspended on the occurrence of a pre-determined date.

89. The teaching device of claim 70, wherein the initial application is suspended on the occurrence of a pre-determined time.

90. The teaching device of claim 70, wherein the initial application is suspended after the elapse of a variable time interval.

91. The teaching device of claim 90, wherein the variable time interval varies in relation to a difference between a present data and a pre-determined date.

92. The teaching device of claim 70, wherein a difficulty level of the interactive educational application varies in relation to a difference between a present date and a pre-determined date.

93. A method of suspending a primary application so that a user must perform an educational task, the method comprising:
   a. suspending a first primary application at a first execution point on an electronic device based on suspension criteria;
   b. presenting on the electronic device an educational task from a set of educational tasks;
   c. receiving a user-generated response on an input device;
   d. repeating steps b and c until a resumption criterion is met;
   e. resuming the first primary application from the first execution point;
   f. suspending a second application program at a second execution point based on the suspension criterion; and
   g. resuming the second application program from the second execution point when the resumption criterion is met, wherein the first application program and the second application program are concurrently maintained in a suspended state.

94. A teaching device for execution on a host system, the host system executing a first primary application and an interactive application, the teaching device comprising:
   a. means for suspending the first primary application at a first execution point on the host system based on a suspension criterion of the first primary application;
   b. means for executing the interactive educational application on the host system until a resumption criterion is met;
   c. means for resuming the first primary application from the first execution point on the host system when the resumption criterion is met, wherein the means for suspending the first primary application is further configured to suspend a second primary application at a second execution point, the means for resuming the first primary application is further configured to resume the second primary application from the second execution point when the resumption criterion is met, and the means for suspending the first primary application is configured to concurrently maintain the first primary application and the second primary application in a suspended state.

95. A method of suspending a primary application so that a user must perform an educational task, the method comprising:

a. suspending a primary application executing on an electronic device using a control program configured to concurrently maintain a plurality of primary application programs in suspended states, wherein the control program masks interrupt signals to prevent interrupting the control program;
b. presenting on a presentation device an educational task from a set of educational tasks;
c. receiving a user-generated response on an input device;
d. repeating steps b and c until a resumption criterion is met; and
e. resuming the primary application.

96. A teaching device for execution on a host system, the teaching device comprising a computer-readable medium having computer-executable instructions thereon for controlling operation of the host system, the computer-readable medium comprising:
a. a suspension module for suspending a plurality of initial application programs at corresponding execution points on the host system, the suspension module further configured to concurrently maintain the plurality of initial application programs in a suspended state;
b. an execution module for executing an interactive educational application on the host system until a resumption criterion is met; and
c. a resumption module for resuming the plurality of initial application programs at their corresponding execution points on the host system when the resumption criterion is met.

97. A method of suspending a program so that a user must perform an educational task, the method comprising:
a. executing a first program on an electronic device;
b. executing a second program on the electronic device;
c. suspending operation of the second program by the first program in response to receiving a suspend signal transmitted to multiple application programs using a suspension criterion until an educational task presented by the first program is completed; and
d. resuming operation of the second program.

98. A method of suspending a plurality of primary application programs so that a user must perform an educational task, the method comprising:
a. suspending operations of the plurality of primary application programs on an electronic device by transmitting a suspend signal to the plurality of primary application programs;
b. presenting on the electronic device an educational task from a set of educational tasks;
c. receiving a user-generated response on an input device;
d. repeating steps b and c until a resumption criterion is met; and
e. resuming operations of the one or more of the plurality of the primary application programs.

\* \* \* \* \*